(12) United States Patent
Nakashima

(10) Patent No.: US 11,072,696 B2
(45) Date of Patent: Jul. 27, 2021

(54) NITRILE GROUP-CONTAINING COPOLYMER RUBBER AND NITRILE GROUP-CONTAINING COPOLYMER RUBBER CROSS-LINKED PRODUCT

(71) Applicant: ZEON CORPORATION, Tokyo (JP)

(72) Inventor: Tomonori Nakashima, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/491,289

(22) PCT Filed: Mar. 28, 2018

(86) PCT No.: PCT/JP2018/012735
§ 371 (c)(1),
(2) Date: Sep. 5, 2019

(87) PCT Pub. No.: WO2018/181469
PCT Pub. Date: Oct. 4, 2018

(65) Prior Publication Data
US 2020/0024429 A1    Jan. 23, 2020

(30) Foreign Application Priority Data
Mar. 29, 2017 (JP) .............................. JP2017-065322

(51) Int. Cl.
| C08L 9/02 | (2006.01) |
| C08K 5/00 | (2006.01) |
| C08K 5/50 | (2006.01) |
| C08K 7/02 | (2006.01) |
| C08K 3/04 | (2006.01) |
| C08K 3/36 | (2006.01) |

(52) U.S. Cl.
CPC ............. *C08L 9/02* (2013.01); *C08K 5/0025* (2013.01); *C08K 5/50* (2013.01); *C08K 7/02* (2013.01); *C08K 3/04* (2013.01); *C08K 3/36* (2013.01); *C08K 2201/004* (2013.01); *C08L 2205/16* (2013.01)

(58) Field of Classification Search
CPC ...... C08L 9/02; C08L 2205/16; C08L 15/005; C08K 5/0025; C08K 5/50; C08K 7/02; C08K 3/04; C08K 3/36; C08K 2201/004; C08K 5/49

USPC ........................................................ 525/339
See application file for complete search history.

(56) References Cited

U.S. PATENT DOCUMENTS

| 5,651,995 | A | 7/1997 | Oyama et al. |
| 2004/0229999 | A1* | 11/2004 | Achten .................... C08K 5/50 525/55 |
| 2005/0158544 | A1* | 7/2005 | Nakamura ........... C08L 2666/14 428/375 |
| 2014/0163170 | A1 | 6/2014 | Nakashima et al. |
| 2016/0326322 | A1 | 11/2016 | Obrecht |
| 2017/0037224 | A1* | 2/2017 | Nakashima ............. C08K 5/17 |
| 2017/0253729 | A1 | 9/2017 | Nakashima |
| 2017/0327672 | A1 | 11/2017 | Inoue et al. |

FOREIGN PATENT DOCUMENTS

| CN | 105829433 A | 8/2016 |
| CN | 105916884 A | 8/2016 |
| JP | H08-100085 A | 4/1996 |
| JP | 2001-342358 A | 12/2001 |
| JP | 2014-122334 A | 7/2014 |
| JP | 2017-504692 A | 2/2017 |
| WO | 2013/015373 A1 | 1/2013 |
| WO | 2015/098806 A1 | 7/2015 |
| WO | 2016031848 A1 | 3/2016 |
| WO | 2016084734 A1 | 6/2016 |

OTHER PUBLICATIONS

Jun. 19, 2018 International Search Report issued in International Patent Application No. PCT/JP2018/012735.
Oct. 1, 2020 Extended Search Report issued in European Patent Application No. 18774192.1.
Mar. 18, 2021 Office Action issued in Chinese Patent Application No. 201880014719.7.
Jan. 20, 2021 Office Action issued in Indian Patent Application No. 201917035652.

* cited by examiner

*Primary Examiner* — Robert C Boyle
(74) *Attorney, Agent, or Firm* — Oliff PLC

(57) ABSTRACT

A rubber composition including a nitrile group-containing copolymer rubber with an iodine value smaller than or equal to 120; short fibers with an average fiber length smaller than or equal to 12 mm; and an organophosphorus compound, wherein a glass transition temperature difference ΔTg of the nitrile group-containing copolymer rubber is lower than or equal to 10° C.

7 Claims, No Drawings

NITRILE GROUP-CONTAINING COPOLYMER RUBBER AND NITRILE GROUP-CONTAINING COPOLYMER RUBBER CROSS-LINKED PRODUCT

TECHNICAL FIELD

The present invention relates to a nitrile group-containing copolymer rubber and a nitrile group-containing copolymer rubber cross-linked product.

BACKGROUND ART

In the past, a hydrogenated nitrile group-containing copolymer rubber such as a hydrogenated nitrile rubber (HNBR) has been widely used for various hoses, O-rings, belts, and so forth for automobiles because a rubber cross-linked product with excellent heat resistance, oil resistance, ozone resistance, and so forth can be obtained therefrom. In addition, there is a need to further improve the performance of a nitrile group-containing copolymer rubber along with an increase in the power output of an automobile engine, exhaust gas emission control, and so forth.

For example, Patent Document 1 (International Publication No. 2013/015373) discloses a technique for enhancing the tensile stress of rubber cross-linked product using a nitrile group-containing copolymer rubber composition where short fibers are mixed with nitrile group-containing saturated copolymers.

PRIOR ART DOCUMENTS

Patent Documents

Patent Document 1:
International Publication No. 2013/015373

SUMMARY OF THE INVENTION

Problem to be Solved by the Invention

However, a rubber cross-linked product obtained from a conventional nitrile group-containing copolymer rubber has excellent tensile stress but its cold resistance is not necessarily sufficient.

It is an object of the present invention to provide a nitrile group-containing copolymer rubber composition which provides a rubber cross-linked product having high tensile stress and excellent cold resistance.

Means for Solving the Problem

In order to solve the above-mentioned problem, one aspect of the present invention is a nitrile group-containing copolymer rubber composition including a nitrile group-containing copolymer rubber having an iodine value smaller than or equal to 120; short fibers having an average fiber length smaller than or equal to 12 mm; and an organophosphorus compound, wherein a glass transition temperature difference $\Delta Tg$ of the nitrile group-containing copolymer rubber is lower than or equal to 10° C.

Advantageous Effect of the Invention

According to the aspect of the present invention, a nitrile group-containing copolymer rubber composition can be provided, from which a rubber cross-linked product having high tensile stress and excellent cold resistance can be obtained.

MODE FOR CARRYING OUT THE INVENTION

Hereinafter, a mode for carrying out the present invention will be described in detail.

Nitrile Group-Containing Copolymer Rubber Composition

A nitrile group-containing copolymer rubber composition according to a mode for carrying out the present invention (carrying-out mode) is a nitrile group-containing copolymer rubber composition containing a nitrile group-containing copolymer rubber having an iodine value smaller than or equal to 120; short fibers having an average fiber length smaller than or equal to 12 mm, and an organophosphorus compound, wherein a glass transition temperature difference $\Delta Tg$ of the nitrile group-containing copolymer rubber is lower than or equal to 10° C.

Nitrile Group-Containing Copolymer Rubber

A nitrile group-containing copolymer rubber to be used in the present carrying-out mode has $\alpha, \beta$-ethylenically unsaturated nitrile monomer units and conjugated diene monomer units, and, preferably, at least some of the conjugated diene monomer units are hydrogenated.

$\alpha, \beta$-ethylenically unsaturated nitrile monomers that form the $\alpha, \beta$-ethylenically unsaturated nitrile monomer units are not particularly limited as long as the $\alpha, \beta$-ethylenically unsaturated nitrile monomers are of a $\alpha, \beta$-ethylenically unsaturated compound having a nitrile group. As the $\alpha, \beta$-ethylenically unsaturated nitrile monomers, acrylonitrile; $\alpha$-halogeno acrylonitrile such as $\alpha$-chloroacrylonitrile or $\alpha$-bromoacrylonitrile; $\alpha$-alkyl acrylonitrile such as methacrylonitrile or ethacrylonitrile; and so forth may be cited. Thereamong, acrylonitrile and methacrylonitrile are preferred, and acrylonitrile is more preferred. One type from among these types of the $\alpha, \beta$-ethylenically unsaturated nitrile monomers may be used solely; a plurality of types from among these types may be used in combination.

The content of the $\alpha, \beta$-ethylenically unsaturated nitrile monomer units in the nitrile group-containing copolymer rubber may be 10 to 60%, by weight, of the total monomer units, preferably, 20 to 50% by weight, and more preferably, 30 to 45% by weight. If the content of the $\alpha, \beta$-ethylenically unsaturated nitrile monomer units is too small, the tensile strength, tensile stress and oil resistance of the resulting rubber cross-linked product may be degraded. If the content is too large, the cold resistance of the resulting rubber cross-linked product may be degraded.

As conjugated diene monomers that form the conjugated diene monomer units, conjugated diene monomers having 4 to 6 carbon atoms such as 1,3-butadiene, isoprene, 2,3-dimethyl-1,3-butadiene, 1,3-pentadiene, chloroprene, and so forth may be cited. Thereamong, 1,3-butadiene and isoprene are more preferred, and 1,3-butadiene is particularly preferred. One type from among these types of the conjugated diene monomers may be used solely; a plurality of types from among of these types may be used in combination.

The content of the conjugated diene monomer units in the nitrile group-containing copolymer rubber is 40 to 90% by weight, preferably 50 to 80% by weight, more preferably 55 to 70% by weight, of the total monomer units. If the content of the conjugated diene monomer units is too small, the rubber elasticity of the resulting rubber cross-linked product is reduced. If the content is too large, the chemical stability of the resulting rubber cross-linked product may be lost. The content of the conjugated diene monomer units is a content including the content of the hydrogenated conjugated diene monomer units when hydrogenation is performed as will be described later.

The nitrile group-containing copolymer rubber to be used in the present carrying-out mode may also contain, in addition to the α, β-ethylenically unsaturated nitrile monomer units and the conjugated diene monomer units, units of other monomers copolymerizable with the above-mentioned monomer units. As the other monomers, ethylene, α-olefin monomers, unconjugated diene monomers, aromatic vinyl monomers, fluorine-containing vinyl monomers, α, β-ethylenically unsaturated monocarboxylic acid and its ester, α, β-ethylenically unsaturated polycarboxylic acid, α, β-ethylenically unsaturated polycarboxylic acid monoester, ethylenically unsaturated polycarboxylic acid monoester and polyvalent ester, α, β-ethylenically unsaturated polycarboxylic anhydride, cross-linkable monomers, a copolymerizable antiaging agent, and so forth may be cited.

The α-olefin monomers preferably have a carbon number of 3 to 12; examples thereof include propylene, 1-butene, 4-methyl-1-pentene, 1-hexene, and 1-octene.

The unconjugated diene monomers preferably have a carbon number of 5 to 12; example thereof include 1,4-pentadiene, 1,4-hexadiene, vinyl norbornene, and dicyclopentadiene.

As the aromatic vinyl monomers, styrene, α-methylstyrene, vinyl pyridine, and so forth may be cited.

As the fluorine-containing vinyl monomers, fluoroethylvinyl ether, fluoropropyl vinyl ether, o-trifluoromethylstyrene, vinyl pentafluorobenzoate, difluoroethylene, tetrafluoroethylene, and so forth may be cited.

As the α, β-ethylenically unsaturated monocarboxylic acid, acrylic acid, methacrylic acid, crotonic acid, cinanamic acid, and so forth may be cited.

As the α, β-ethylenically unsaturated monocarboxylic acid ester, (meth)acrylic acid ester (abbreviations of methacrylic acid ester and acrylic acid ester, the same hereinafter) having an alkyl group of 1 to 18 carbon atoms, such as methyl acrylate, ethyl acrylate, n-butyl acrylate, isobutyl acrylate, n-dodecyl acrylate, methyl methacrylate, or ethyl methacrylate; (meth)acrylic acid ester having an alkoxyalkyl group of 2 to 18 carbon atoms such as methoxymethyl acrylate, methoxyethyl acrylate, ethoxypropyl acrylate, methoxybutyl acrylate, methoxydodecyl acrylate, methoxyethyl methacrylate, methoxybutyl methacrylate, or ethoxypentyl methacrylate; (meth)acrylic acid ester having a cyanoalkyl group of 2 to 12 carbon atoms such as α-cyanoethyl acrylate, α-cyanoethyl methacrylate, or cyanobutyl methacrylate; (meth)acrylic acid ester having a hydroxyalkyl group with 1-12 carbon atoms, such as 2-hydroxyethyl acrylate, 2-hydroxypropyl acrylate, or 2-hydroxyethyl methacrylate; (meth) acrylic acid ester having a fluoroalkyl group with 1-12 carbon atoms, such as trifluoroethyl acrylate or tetrafluoropropyl methacrylate; and so forth may be cited.

As the α, β-ethylenically unsaturated polycarboxylic acid, maleic acid, fumaric acid, itaconic acid, and so forth may be cited.

As the α, β-ethylenically unsaturated polycarboxylic acid monoester, for example, maleic acid monoalkyl ester such as monomethyl maleate, monoethyl maleate, monopropyl maleate, or mono-n-butyl maleate; fumaric acid monoalkyl ester such as monoethyl fumarate, monomethyl fumarate, monopropyl fumarate, or mono-n-butyl fumarate; citraconic acid monoalkyl ester such as monomethyl citraconate, monoethyl citraconate, monopropyl citraconate, or mono-n-butyl citraconate; itaconic acid monoalkyl ester such as monomethyl itaconate, monoethyl itaconate, monopropyl itaconate, or mono-n-butyl itaconate; and so forth may be cited.

As the α, β-ethylenically unsaturated polycarboxylic acid polyvalent ester, for example, dimethyl maleate, di-n-butyl fumarate, dimethyl fumarate, di-n-butyl fumarate, dimethyl itaconate, di-n-butyl itaconate, di-2-ethylhexyl itaconate, and so forth may be cited.

As the α, β-ethylenically unsaturated polycarboxylic anhydride, for example, maleic anhydride, itaconic anhydride, and so forth may be cited.

As the cross-linkable monomers, multifunctional ethylenically unsaturated monomers such as a divinyl compound such as divinylbenzene; di(meth)acrylic acid ester such as diethylene glycol di(meth)acrylic acid ester or ethylene glycol di(meth)acrylic acid ester; tri(meth)acrylic acid ester such as trimethylolpropane tri(meth)acrylic acid ester, as well as self-cross-linkable monomers such as N-methylol (meth)acrylamide or N,N'-dimethylol (meth)acrylamide, and so forth may be cited.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy) aniline, and so forth may be cited.

One type from among these types of the copolymerizable other monomers may be used solely; a plurality of types from among these types may be used in combination.

The content of the units of the other monomers contained in the nitrile group-containing copolymer rubber is preferably not more than 50% by weight, more preferably not more than 30% by weight, and particularly preferably not more than 10% by weight.

The iodine value of the nitrile group-containing copolymer rubber to be used in the present carrying-out mode is smaller than or equal to 120, preferably smaller than or equal to 60, more preferably smaller than or equal to 30, and particularly preferably smaller than or equal to 10. If the iodine value of the nitrile group-containing copolymer rubber of the present carrying-out mode is too large, the heat resistance and ozone resistance of the resulting rubber cross-linked product may be reduced.

Further, the Mooney viscosity [ML1+4 (100° C.)] measured in accordance with JIS K6300-1 of the nitrile group-containing copolymer rubber to be used in the present carrying-out mode is 10 to 200, preferably 25 to 150, and particularly preferably 50 to 120. If the Mooney viscosity of the nitrile group-containing copolymer rubber is too small, the mechanical properties of the rubber cross-linked product may be degraded; if the Mooney viscosity of the nitrile group-containing copolymer rubber is too large, the processability of the rubber composition may be degraded.

The glass transition temperature difference ΔTg of the nitrile group-containing copolymer rubber to be used in the present carrying-out mode is lower than or equal to 10° C., The glass transition temperature difference ΔTg is the temperature difference between the extrapolated glass transition initiation temperature (Tig) and the extrapolated glass transition ending temperature (Teg) in the differential scanning calorimetry, as specified in JIB K7121, "Method for Measuring Plastic Transition Temperature".

One type of the nitrile group-containing copolymer rubber may be used solely; a plurality of types of the nitrile group-containing copolymer rubber may be used in combination. If a plurality of types of the nitrile group-containing copolymer rubber are used in combination, the temperature difference between the lowest extrapolated glass transition initiation temperature (Tig) and the highest extrapolated glass transition ending temperature (Teg) in the whole system including the combined types is used as the glass transition temperature difference ΔTg. In this case, it is necessary that the temperature difference (ΔT) between the lowest extrapolated glass transition initiation temperature (Tig) and the highest extrapolated glass transition ending temperature (Teg) in the whole system including the combined types is lower than or equal to 10° C.

If the glass transition temperature difference ΔTg is too large, the cold resistance of the resulting rubber cross-linked product is degraded. The glass transition temperature difference ΔTg is preferably lower than or equal to 8° C., more preferably lower than or equal to 7° C., and yet more preferably lower than or equal to 6° C.

The method of producing the nitrile group-containing copolymer rubber is not particularly limited. According to the present carrying-out mode, the nitrile group-containing copolymer rubber can be obtained from preparing a nitrile group-containing copolymer rubber by copolymerizing α, β-ethylenically unsaturated nitrile monomers, conjugated diene monomers, and other monomers copolymerizable with these monomers optionally added thereto, and then, hydrogenating the prepared nitrile group-containing copolymer rubber.

According to the present invention, for producing the nitrile group-containing copolymer rubber, assuming that the total amount of monomers used for the copolymerization is 100%, it is preferable to first start the copolymerization of 80 to 99% by weight of the total amount of the monomers, and then, at a time when the polymerization conversion rate becomes 40 to 90%, add the remainder (i.e., 1 to 20% by weight) of the monomers used for the copolymerization, to obtain the copolymers. In this regard, when monomers are thus added during the copolymerization, the adding may be implemented dividedly a plurality of times. For example, in a case where the adding is implemented dividedly two times, the first addition is performed when the polymerization conversion rate becomes preferably 20 to 50%, and the second addition is performed when the polymerization conversion rate becomes preferably 50 to 70%. By using such a method, the glass transition temperature difference ΔTg of the nitrile group-containing copolymer rubber can be controlled to a desired range.

As a specific method of the polymerization, any one of the known emulsion polymerization, suspension polymerization, bulk polymerization, and solution polymerization may be used; emulsion polymerization is preferable because the polymerization reaction can be easily controlled. In emulsion polymerization, commonly used subsidiary materials such as an emulsifier, a polymerization initiator, a molecular weight modifier, and so forth may be used.

When the iodine value of copolymers (X) obtained through the copolymerization is larger than the abovementioned range, it is preferable to hydrogenate (implement a hydrogenation reaction) the copolymers. A specific method of hydrogenation is not particularly limited and a known method may be used.

The emulsifier is not particularly limited, but, for example, a non-ionic emulsifier such as polyoxyethylene alkyl ether, polyoxyethylene alkyl phenol ether, polyoxyethylene alkyl ester, or polyoxyethylene sorbitan alkyl ester; an anionic emulsifier such as a fatty acid salt such as a myristic acid, a palmitic acid, an oleic acid, or a linoleic acid, alkylbenzene sulfonate such as sodium dodecylbenzene sulfonate, a higher alcohol sulfuric ester salt, or alkyl sulfosuccinate; a copolymerizable emulsifier such as sulfoester of α, β-unsaturated carboxylic acid, sulfate ester of α, β-unsaturated carboxylic acid, or sulfoalkyl arylether; or the like may be used. The amount of the emulsifier to be used is preferably 0.1 to 10 parts by weight relative to 100 parts by weight of the total monomers.

The polymerization initiator is not particularly limited as long as it is a radical initiator, but, an inorganic peroxide such as potassium persulfate, sodium persulfate, potassium persulfate, or a hydrogen peroxide; an organic peroxide such as a t-butyl peroxide, a cumene hydroperoxide, a p-mentan hydroperoxide, a di-t-butyl Peroxide, a t-butylcumyl peroxide, an acetyl peroxide, an isobutyryl peroxide, an octanoyl peroxide, a dibenzoyl peroxide, a 3,5,5-trimethylhexanoyl peroxide, or a t-butyl peroxyisobutylate; an azo compound such as azobisisobutyronitrile, azobis-2,4-dimethylvaleronitrile, azobiscyclohexane carbonitrile, or methyl azobisisobutyrate; or the like may be used. One from among these polymerization initiators may be used solely; a plurality from among these polymerization initiators may be used in combination.

As the polymerization initiator, an inorganic peroxide or an organic peroxide is preferred. When a peroxide is used as the polymerization initiator, a peroxide may be used as a redox-based polymerization initiator in combination with a reducing agent such as sodium bisulfite or ferrous sulfate. The amount of the polymerization initiator to be used is preferably 0.01 to 2 parts by weight relative to 100 parts by weight of the total monomers.

The molecular weight modifier is not particular limited, but, mercaptan such as t-dodecyl mercaptan, n-dodecyl mercaptan, or octyl mercaptan; halogenated hydrocarbon such as carbon tetrachloride, methylene chloride, or methylene bromide; α-methylstyrene dimer; a sulfur-containing compound such as tetraethyl thiuram disulfide, dipentamethylene thiuram disulfide, diisopropyl xanthogen disulfide; or the like may be used. One thereamong may be used solely; a plurality thereamong may be used in combination. Thereamong, mercaptan is preferred, and t-dodecyl mercaptan is more preferred. The amount of the molecular weight modifier to be used is preferably 0.1 to 0.8 parts by weight relative to 100 parts by weight of the total monomers.

Water is commonly used as a medium for the emulsion polymerization. The amount of water is preferably 80 to 500 parts by weight relative to 100 parts by weight of the total monomers.

In the emulsion polymerization, further polymerization subsidiary materials such as a stabilizer, a dispersant, a pH regulator, a deoxidant, a particle size regulator, and so forth may be used as needed. When these are used, neither the types nor the amounts of use are particularly limited.

In nitrile group-containing copolymer rubber in a resulting latex of the nitrile group-containing copolymer rubber, double bonds of conjugated diene monomer units may be selectively hydrogenated. Thereafter, the nitrile group-containing copolymer rubber to be used in the present invention can be produced by solidifying and drying the resulting latex and so forth or the like obtained through the hydrogenation. The hydrogenation may be implemented in such a way that the copolymers obtained from the emulsion polymerization in a latex state are hydrogenated. In this regard, it is also possible that, after solidifying and drying of the latex state copolymers, the latex state copolymers are dissolved in an organic solvent such as acetone, and then, are hydrogenated.

The type and amount of the hydrogenation catalyst used in the hydrogenation process, the temperature of the hydrogenation process, and so forth, may be determined by known methods.

Short Fibers

The short fibers contained in the nitrile group-containing copolymer rubber composition of the present carrying-out mode have an average fiber length smaller than or equal to 12 mm. The average fiber length is an arithmetic average value calculated using the measured lengths of 100 short fibers randomly selected from a photograph taken by a light microscopy. If the average fiber length of the short fibers is too large, the short fibers tend to be tangled together and it may be difficult to disperse in the rubber composition; if the average fiber length of the short fibers is too small, it may be difficult to obtain the desired tensile stress.

The average fiber length of the short fibers is preferably 0.5 to 10 mm, and particularly preferably 1 to 8 mm. Furthermore, from a viewpoint of enhancing the tensile stress of the rubber cross-linked product, the average fiber diameter of the short fibers is preferably 0.5 to 100 μm, more preferably 1 to 50 μm, and particularly preferably 2 to 20 μm. The average fiber diameter is an arithmetic average of the diameters at the thickest portions of 100 short fibers randomly selected from a photograph taken by a light microscopy.

The aspect ratio of the short fibers ([the average fiber length of the short fibers]/[the average fiber diameter of the short fibers]) is preferably 5 to 1000, and particularly preferably 50 to 800. If the aspect ratio of the short fibers falls within the above ranges, the tensile stress of the rubber cross-linked product is further enhanced.

As the short fibers, organic fibers and inorganic fibers may be cited. As the organic fibers, natural fibers such as cotton or wood cellulose fibers; fibers made of synthetic resin such as polyamide, polyester, polyvinyl alcohol, rayon, polyparaphenylene benzobisoxazole, polyethylene, polypropylene, polyarylate, polyimide, polyphenylene sulfide, polyether ether ketone, polylactic acid, polycaprolactone, polybutylene succinate, or fluorine-based polymers; and so forth may be cited. As the inorganic fibers, glass fibers, carbon fibers, potassium titanate whiskers; and so forth may be cited.

Thereamong, from a viewpoint to increase the tensile strength of the rubber cross-linked product, it is preferable to use organic fibers, more preferably fibers made of synthetic resin, and yet more preferably fibers made of polyamide.

As the polyamide, alipharic polyamide such as polycapramide, poly-ω-amino-heptancic acid, poly-ω-amino-nonanoic acid, polyundecanoamide, polyethylenediamine adipamide, polytetramethylene adipamide, polyhexamethylene adipamide, polyhexamethylene sebacamide, polyhexamethylene dodecamide, polyoctamethylene adipamide, or polydecamethylene adipamide; aromatic polyamide (aramide) such as poly-(paraphenylene terephthalamide) (for example, product name "Kevlar" and registered trademark "KEVLAR" made by Du Pont-Toray Co., Ltd.), poly-(metaphenylene isophthalamide) (product name "Conex" and registered trademark "Conex" made by Teijin Ltd.), co-poly-(paraphenylene/3,4'-oxydiphenylene terephthalamide) (product name "Technora" and registered trademark "Technora" made by Teijin Ltd.), polymethoxylene adipamide, polymethaxylene pimelamide, polymethaxylene azeramide, polyparaxylylene azelamide, or polyparaxylylene decanamide; and so forth may be cited. Thereamong, aromatic polyamide (aramide) is preferred because of extremely high tensile stress and the ease with which a rubber cross-linked product having excellent low heat build-up can be obtained; poly-(paraphenylene terephthalamide), poly-(metaphenylene isophthalamide), and co-poly-(paraphenylene/3,4'-oxydiphenylene terephthalamide) are more preferred; and co-poly-(paraphenylene/3,4'-oxydiphenylene terephthalamide) is particularly preferred.

One from among the types of short fibers may be used solely; a plurality from among the types of short fibers may be used in combination.

Because it is easier to obtain the rubber cross-linked product having very high tensile stress and excellent low heat build-up, the content ratio of the short fibers is, relative to 100 parts by weight of the nitrile group-containing copolymer rubber, preferably 1 to 30 parts by weight, more preferably 2 to 20 parts by weight, and particularly preferably 3 to 15 parts by weight.

The short fibers may be those surface-treated by an adhesive composition including epoxy-based resin and latex, an adhesive composition including isocyanate-based resin and latex, an adhesive composition including resorcinol-formaldehyde resin and latex (RFL), or the like.

Organophosphorus Compound

The nitrile group-containing copolymer rubber composition of the present carrying-out mode further contains an organophosphorus compound. The inclusion of an organophosphorus compound in addition to the short fibers described above provides a rubber cross-linked product with high tensile stress and excellent cold resistance.

As the organophosphorus compound, an organic phosphine compound is preferred. As the organic phosphine compound, organic phosphine such as trimethylphosphine, triethylphosphine, tributylphosphine, triphenylphosphine, tris(paratril)phosphine, tris(parafluorophenyl)phosphine, or tris(2,6-dimethylphenyl)phosphine; a phosphine oxide such as a triphenylphosphine oxide or a diphenylmethylphosphine oxide; phosphine sulfide such as triphenylphosphine sulfide or diphenylmethylphosphine sulfide; and so forth may be cited. Thereamong, from a viewpoint of increasing both tensile stress and cold resistance, triphenylphosphine, a triphenylphosphine oxide, and triphenylphosphine sulfide are preferred, and triphenylphosphine and a triphenylphosphine oxide are particularly preferred.

Because it is easier to obtain a rubber cross-linked product having extremely high tensile stress and excellent low heat build-up, the content of the organophosphorus compound is, relative to 100 parts by weight of the nitrile group-containing copolymer rubber, preferably 0.1 to 2 parts by weight, more preferably 0.2 to 1.8 parts by weight, and particularly preferably 0.3 to 1.5 parts by weight.

The nitrile group-containing copolymer rubber composition to be used in the present carrying-out mode can contain a cross-linking agent in addition to the above-described nitrile group-containing copolymer rubber, short fibers, and organophosphorus compound. As long as the cross-linking agent is capable of cross-linking the nitrile group-containing copolymer rubber described above, the cross-linking agent is not particularly limited. As the cross-linking agent, for example, an organic peroxide cross-linking agent, a sulfur cross-linking agent, a polyamine cross-linking agent, and so forth may be cited. Thereamong, an organic peroxide cross-linking agent is preferable from a viewpoint that the advantageous effect of the present invention is more pronounced.

As the organic peroxide cross-linking agent, dialkyl peroxides, diacyl peroxides, peroxy esters, and so forth may be cited, and, dialkyl peroxides are preferable. As the dialkyl peroxides, for example, a dicumyl peroxide, a di-t-butyl peroxide, 2,5-dimethyl-2,5-di (t-butylperoxy)-3-hexyne, 2,5-dimethyl-2,5-di(t-butylperoxy)hexane, 1,3-bis(t-butylperoxyisopropyl)benzene, and so forth may be cited. As the diacyl peroxides, for example, a benzoyl peroxide, an isobutyryl peroxide, and so forth may be cited. As the peroxy esters, dimethyl-2,5-bis(benzoylperoxy)hexane, t-butylperoxyisopropyl carbonate, and so forth may be cited.

As the sulfur cross-linking agent, sulfur such as powdered sulfur or precipitated sulfur; an organic sulfur compound such as 4,4-dithiomorpholine, tetramethyl thiuram disulfide, tetraethyl thiuram disulfide, or polymeric polysulfide; and so forth may be cited.

As the polyamine cross-linking agent, hexamethylene diamine, hexamethylene diamine carbamate, 2,2-bis[4-(4-aminophenoxy)phenyl]propane, 4,4'-methylenedianiline, m-phenylenediamine, dihydrazide adipate, and so forth may be cited.

In the nitrile group-containing copolymer rubber composition of the present carrying-out mode, the content of the cross-linking agent is, relative to 100 parts by weight of the nitrile group-containing copolymer rubber, preferably 0.1 to 20 parts by weight, more preferably 0.5 to 15 parts by weight, and more preferably 1.0 to 10 parts by weight. If the content of the cross-linking agent is too small, the tensile stress of the resulting rubber cross-linked product may be reduced: if the content of the cross-linking agent is too large, the fatigue resistance of the resulting rubber cross-linked product may become poor.

The nitrile group-containing copolymer rubber composition of the present carrying-out mode may further include other ingredients. As the other ingredients, for example, a filler; a $\alpha$, $\beta$-ethylenically unsaturated carboxylic acid metal salt such as zinc methacrylate or zinc acrylate; a metal oxide such as a zinc oxide or a magnesium oxide; a cross-linking promoter, coagent, a cross-linking retardant, an antiaging agent, an antioxidant, a light stabilizer, an antiscorching agent, a silane coupling agent, a plasticizer, a processing aid, a slip additive, an adhesive, a lubricant, a flame retardant, an antimold agent, an acid acceptor, an antistatic agent, a pigment, and so forth may be mixed.

The amounts of these other ingredients to be mixed are not particularly limited to the extent that they do not inhibit the purposes and effects of the present invention, and may be determined in accordance with the purpose of mixing them.

The filler is not particularly limited but a carbon-based material such as carbon black, graphite, or the like can be used. In particular, it is preferable to use carbon black. Specific examples of the carbon black include furnace black, acetylene black, thermal black, channel black, and so forth. Thereamong, it is preferred to use furnace black such as SAF (N110), ISAF (N220), ISAF-HS (N234), ISAF-LS, IIAF-HS, HAF (N330), HAF-HS (N339), HAF-LS (N326), MAF, FEF (N550), SRF (N762, N774), or the like. Specific example of the thermal black includes FT, MT (N990), and so forth. Specific examples of the graphite include natural graphite such as vein graphite or flake graphite and artificial graphite.

As a filler other than a filler made of a carbon-based material, for example, powder such as metal powder such as aluminum powder; inorganic powder such as hard clay, talc, calcium carbonate, a titanium oxide, calcium sulfate, calcium carbonate, or aluminum hydroxide; organic powder such as starch or polystyrene powder; or the like; silica or mica; and so forth may be cited. Thereamong, silica is preferred.

As the silica, natural silica such as quartz powder or silica powder; synthetic silica such as anhydrous silicic acid (silica gel, aerosil, or the like; "aerosil" being a registered trademark), hydrous silicic acid, and so forth may be cited. Thereamong, synthetic silica is preferred. These types of silica may be used after being surface-treated with a silane coupling agent or the like.

One from among these fillers may be used solely; a plurality from among these fillers may be used in combination. The amount of the filler to be mixed is preferably 5 to 200 parts by weight, more preferably 10 to 100 parts by weight, and more preferably 15 to 75 parts by weight, relative to 100 parts by weight of the nitrile group-containing copolymer rubber, from a viewpoint of improving tensile stress.

Specific examples of the coagent used when an organic peroxide cross-linking agent is used as the cross-linking agent includes a polyfunctional vinyl compound such as divinylbenzene or divinyl naphthalene; isocyanurate such as triallyl isocyanurate or trimethallyl isocyanurate; cyanurate such as triallyl cyanurate; maleimide such as N,N-m-phenylenedimaleimide, 4,4'-diphenylmethane bismaleimide, bisphenol A diphenyl ether bismaleimide, 3,3'-dimethyl-5, 5'-diethyl-4,4'-diphenyl methane bis maleimide, or N,N'-(4-methyl-1,3-phenylene)bis(maleimide); allyl ester of polyhydric acid such as diallyl phthalate, diallyl isophthalate, diallyl maleate, diallyl fumarate, diallyl sebacate, or triallyl phosphate; diethylene glycol bisallyl carbonate; allyl ether such as ethylene glycol diallyl ether, trimethylol propane triallyl ether, or pentaerythritol partial allyl ether; allyl-modified resin such as allyl-modified novolac or allyl-modified resole resin; a tri to panta-functional methacrylate compound such as trimethylol propane trimethacrylate or trimethylol propane triacrylate or an acrylate compound; aromatic or aliphatic organic diisocyanate; polyisocyanate; an aromatic nitroso compound; and so forth may be cited.

One from among these coagents may be used solely; a plurality from among these coagents may be used in combination. The amount of the coagent to be mixed is not particularly limited, but is, relative to 100 parts by weight of nitrile group-containing copolymer rubber, preferably 0.5 to 20 parts by weight, and more preferably 1 to 10 parts by weight.

As the antiaging agent, an aromatic secondary amine compound [such as phenylnaphthylamine, 4,4'-($\alpha$, $\alpha$-dimethylbenzyl)diphenylamine, or N,N'-di-2-naphthyl-p-phenylenediamine], a phenolic compound [such as 2,6-di-t-butyl-4-methylphenol or tetrakis-[methylene-3-(3',5-di-t-butyl-4'-hydroxyphenyl) propionate]methane], a sulfur-containing compound [such as dibenzothiazil disulfide, bis [2-methyl-4-(3-n-alkylthiopropionyloxy)-5-t-butylphenyl] sulfide, or nickel dibutyldithiocarbamate], a benzimidazole-based compound (such as a metal salt of 2-mercaptobenzimidazole), and a quinoline-based compound (such as polymers of 2,2,4-trimethyl-1,2-dihydroquinoline), and so forth may be cited.

One from among these antiaging agents may be used solely; a plurality from among these antiaging agents may be used in combination. The amount of the antiaging agent to be mixed is preferably 0.1 to 10 parts by weight, more preferably 0.5 to 8 parts by weight, and yet more preferably 1 to 5 parts by weight, relative to 100 parts by weight of nitrile group-containing copolymer rubber.

The plasticizer may be, but is not limited to, a trimellitic acid-based plasticizer, a pyromellitic acid-based plasticizer, an ether ester-based plasticizer, a polyester-based plasticizer, a phthalic acid-based plasticizer, an adipic ester-based plasticizer, a phosphate ester-based plasticizer, a sebacic acid ester-based plasticizer, an alkylsulfonate ester compound plasticizer, an epoxylated vegetable oil-based plasticizer, or the like. Specific examples thereof include tri-2-ethylhexyl trimellitate, trimellitic acid isononyl ester, trimellitic acid mixed linear alkyl ester, dipentaerythritol ester, pyromellitic acid 2-ethylhexyl ester, polyether ester (molecular weight: approximately 300-5000), bis[2-(2-butoxyethoxy)ethyl] adipate, dioctyl adipate, adipic acid-based polyester (molecular weight: approximately 300-5000), dioctyl phthalate, diisononyl phthalate, dibutyl phthalate, tricresyl phosphate, sebacic acid dibutyl, alkylsulfonate phenyl ester, epoxylated soybean oil, diheptanoate, di-2-ethylhexanoate, didecanoate, or the like. One from among these plasticizers may be used solely; a plurality from among these plasticizers may be used in combination.

The coupling agent may be, but is not limited to, a silane-based coupling agent, an aluminum-based coupling agent, a titanate-based coupling agent, or the like. Specific examples thereof include a silane coupling agent containing sulfur such as γ-mercaptopropyl trimethoxysilane, γ-mercaptomethyl trimethoxysilane, γ-mercaptohexamethyl disilazane, bis(3-triethoxysilylpropyl)tetrasulfane, or bis(3-triethoxysilylpropyl)disulfane; an epoxy group-containing silane coupling agent such as γ-glycidoxypropyltrimethoxysilane, γ-glycidoxypropyldimethoxysilane, β-(3,4-epoxycyclohexyl)ethyltrimethoxysilane, γ-mercaptopropyltrimethoxysilane, or γ-glycidoxypropylmethyl diethoxysilane; an amino group-containing silane coupling agent such as N-(p-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butyridene)propylamine, or N-phenyl-3-aminopropyltrimethoxysilane; a (meth)acryloxy group-containing silane coupling agent such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxyoropyltriethoxysilane, or γ-acryloxypropyltrimethoxysilane; a vinyl group-containing silane coupling agent such as vinyltrimethoxysilane, vinyltriethoxysilane, vinyltris(β-methoxyethoxy) silane, vinyltrichlorosilane, or vinyltriacetoxysilane; a chloropropyl group-containing silane coupling agent such as 3-chloropropyltrimethoxysilane; an isocyanate group-containing silane coupling agent such as 3-isocyanatepropyltriethoxysilane; a styryl group-containing silane coupling agent such as p-styryltrimethoxysilane; an ureide group-containing silane coupling agent such as 3-ureidopropyltriethoxysilane; an allyl group-containing silane coupling agent such as diallyl dimethylsilane; an alkoxy group-containing silane coupling agent such as tetraethoxysilane; a phenyl group-containing silane coupling agent such as diphenyldimethoxysilane; a fluoro group-containing silane coupling agent such as trifluoropropyltrimethoxysilane; an alkyl group-containing silane coupling agent such as isobutyltrimethoxysilane or cyclohexylmethyldimethoxysilane; an aluminum-based coupling agent such as acetoalkoxyaluminum diisopropylate; a titanate-based coupling agent such as isopropyltriisostearoyl titanate, isopropyltris(dioctylpyrophosphate)titanate, isopropyltri (N-aminoethyl-aminoethyl)titanate, tetraoctylbis (ditridecylphosphite) titanate, tetra(2,2-diallyloxymethyl-1-butyl)bis(ditridecyl)phosphite titanate, bis(dioctylpyrophosphate) oxyacetate titanate, bis(dioctylpyrophosphate)ethylene titanate, tetraisopropylbis(dioctylphosphite)titanate, or isopropyltriisostearoyl titanate; and so forth may be cited. One from among these coupling agents may be used solely; a plurality from among these coupling agents may be used in combination.

The nitrile group-containing copolymer rubber composition of the present carrying-out mode may be mixed with polymers other than, the nitrile group-containing copolymer rubber described above, to the extent that they do not interfere with the effects of the present invention. As the other polymers, an acrylic rubber, an ethylene-acrylic acid copolymer rubber, a fluorine rubber, a styrene-butadiene copolymer rubber, an ethylene-propylene copolymer rubber, an ethylene-propylene-diene terpolymer rubber, a natural rubber, a polyisoprene rubber, and so forth may be cited. In the case of mixing such other polymers, the amount of mixing them in the nitrile group-containing copolymer rubber composition is preferably not more than 30 parts by weight, more preferably not more than 20 parts by weight, and more preferably not more than 10 parts by weight, relative to 100 parts by weight of the nitrile group-containing copolymer rubber.

The nitrile group-containing copolymer rubber composition of the present carrying-out mode is prepared by mixing of each of the above-mentioned ingredients preferably in a non-aqueous system. A specific method of preparing the nitrile group-containing copolymer rubber composition of the present carrying-out mode is not limited. Usually, the nitrile group-containing copolymer rubber composition can be prepared by first kneading the ingredients other than the cross-linking agent, the heat-labile coagent, and so forth with a mixer such as a Banbury mixer, an internal mixer, a kneader, or the like, then transferring the mixture to rolls or the like to add the cross-linking agent, the heat-labile coagent, and so forth, and performing second kneading.

The Mooney viscosity (ML1+4, 100° C.) of the nitrile group-containing copolymer rubber composition of the present carrying-out mode is preferably 10-200, more preferably 15-175, yet more preferably 20-150, and particularly preferably 50-100, from a viewpoint of the processability of the rubber composition and the mechanical properties of the resulting rubber cross-linked product.

Nitrile Group-Containing Copolymer Rubber Cross-Linked Product

The rubber cross-linked product of the present carrying-out mode is obtained from cross-linking the nitrile group-containing copolymer rubber composition of the present carrying-out mode described above.

The rubber cross-linked product of the present carrying-out mode can be produced from using the nitrile group-containing copolymer rubber composition of the present carrying-out mode, for example molding with a molding machine corresponding to a desired shape, such as an extruder, an injection molding machine, a compressor, rolls, or the like, and heating to implement a cross-linking reaction, thereby fixing the shape as the cross-linked product. In this case, the cross-linking may be performed after the molding, or the cross-linking may be performed simultaneously with the molding. The molding temperature is typically between 10° C. and 200° C., and preferably between 25° C. and 120° C., The cross-linking temperature is normally 100-200° C., and preferably 130-190° C.; and the cross-linking time is usually 1 minute to 24 hours, and preferably 2 minutes to 1 hours.

There may be a case where, depending on the shape, size, or the like of the rubber cross-linked product, even if the surface has been cross-linked, the inside has not been sufficiently cross-linked. Therefore, secondary cross-linking may be performed by further heating.

As the heating method, a general method used for cross-linking rubber such as press heating, steam heating, oven heating, hot-air heating, or the like may be suitably selected.

The rubber cross-linked product of the present carrying-out mode thus obtained has high tensile stress and particularly excellent cold resistance.

Therefore, the nitrile group-containing copolymer rubber cross-linked product of the present carrying-out mode may be used for various seal members such as an O-ring, a packing, a diaphragm, an oil seal, a shaft seal, a bearing seal, a well head seal, a seal for a pneumatic device, a seal for sealing in fluorocarbon or fluorohydrocarbon used for a cooling device of an air conditioner or a compressor of a cooling unit of an air-conditioning system or a seal for sealing in carbon dioxide, a seal for sealing in supercritical carbon dioxide or subcritical carbon dioxide used for a washing media in precision washing, a seal for a roller device (a roller bearing, an automotive hub unit, an automotive water pump, a linear guide device, a ball screw, or the like), a valve and a valve seat, a BOP (blow out preventer), a platter, and so forth; and various types of gaskets such as an intake manifold gasket at a connection between an intake manifold and a cylinder head, a cylinder head gasket at a connection between a cylinder block and a cylinder head, a rocker cover gasket at a connection between a rocker cover and a cylinder head, an oil pan gasket at a connection between an oil pan and a cylinder block or a transmission case, a fuel cell separator gasket at a connection between a pair of housings sandwiching a unit cell including a positive electrode, an electrolyte plate, and a negative electrode, a gasket to be used for a top cover of a hard disk drive, and so forth.

The nitrile group-containing copolymer rubber cross-linked product of the present carrying-out mode may be used in broad applications such as various types of rolls such as a printing roll, an ironmaking roll, a papermaking roll, an industrial roll, an office equipment roll, and so forth; various types of belts such as a flat belt (such as a film core flat belt, a cord flat belt, a laminated flat belt, or a single type flat belt), a V-belt (such as a wrapped V-belt or a low edge V-belt), a V-ribbed belt (such as a single V-ribbed belt, a double V-ribbed belt, a wrapped V-ribbed belt, a rubber-backed V-ribbed belt, or a top cog V-ribbed belt), a CVT belt, a timing belt, a toothed belt, an in-oil belt, an oil pump belt, a conveyor belt, and so forth; various types of hoses such as a fuel hose, a turbo air hose, an oil hose, a radiator hose, a heater hose, a water hose, a vacuum brake hose, a control hose, an air-conditioner hose, a brake hose, a power steering hose, an air hose, a marine hose, a riser, a flow line, and so forth; various types of boots such as a CVJ boot, a propeller shaft boot, a constant velocity joint boot, a rack and pinion boot, and so forth; attenuating member rubber parts such as a cushion material, a dynamic damper, a rubber coupling, an air spring, a vibration-proof material, and so forth; a dust cover, an automotive interior trim member, a tire, a covered cable, a shoe sole, an electromagnetic wave shield, a binder for a flexible printed circuit board or another binder, a fuel cell separator; and also other broad applications in the cosmetic and pharmaceutical fields, the electronics field, and so forth. Thereamong, the rubber cross-linked product of the present carrying-out mode can be preferably used as a belt.

EMBODIMENTS

Hereinafter, the carrying-out mode of the present invention will be described in more detail with reference to embodiments and comparative examples. Various tests and evaluations are made according to the following methods. Unless otherwise particularly stated, parts and % are on the weight basis.

Iodine Value

The iodine value of the nitrile group-containing copolymer rubber is measured according to JIS K 6235.

Mooney Viscosity (Polymer Mooney)

Mooney viscosity (polymer Mooney) of hydrogenated acrylonitrile-butadiene copolymers is measured according to JIS K6300-1 (units: [ML1+4, 100° C.].

Glass Transition Temperature Difference ΔTg

According to JIS K7121, a heat flux differential scanning calorimeter (device: made by SII Nanotechnology Inc., X-DSC7000) is used to measure the extrapolated glass transition initiation temperature (Tig) and the extrapolated glass transition ending temperature (Teg); and the glass transition temperature difference ΔTg (Teg−Tig) calculated. In this regard, in order to increase the measurement accuracy, the measurement is implemented in such a manner that the temperature increase rate has been changed from 20° C./min to 10° C./min.

Normal Physical Properties (Tensile Strength, Elongation, and Tensile Stress)

The cross-linkable nitrile rubber composition is placed in a metal mold of 15 cm in length, 15 cm in width, and 0.2 cm in depth, and is press-molded at 170° C. for 20 minutes under 10 MPa pressing pressure to yield a sheet-like rubber cross-linked product. The resulting sheet-like rubber cross-linked product is punched out for a No. 3 dumbbell to produce a specimen. The resulting specimen is then used to measure the tensile strength (MPa), elongation (%), and 10% tensile stress (MPa) of the rubber cross-linked product according to JIS K6251. If the 10% tensile stress is 3 MPa or greater, the specimen is evaluated as being satisfactory.

Cold Resistance (Low-Temperature Brittleness by Impact Test)

In a manner similar to the manner in the above evaluation of normal physical properties, the sheet-like rubber cross-linked product is obtained, followed by a low-temperature brittleness by impact test at 2° C. intervals from −50° C. to −10° C. in accordance with JIS K6261, and the 50% impact brittleness temperature is calculated. The lower the 50% brittleness temperature is, the better the cold resistance is. If the 50% impact brittleness temperature is ow r than or equal to −25° C., the specimen is evaluated as having satisfactory cold resistance; if the 50% impact brittleness temperature is higher than −25° C., the specimen is evaluated as not having satisfactory cold resistance.

Product Example 1 (Production of Hydrogenated Acrylonitrile-Butadiene Copolymer Rubber (A1))

A reactor was charged with two parts of potassium oleate, 180 parts of ion-exchange water, 43 parts of acrylonitrile, and 0.5 parts of t-dodecylmercaptan in the stated order as an emulsifier. After purging of the reactor with nitrogen, 52 parts of 1,3-butadiene was added and the reactor was cooled to 10° C., and then 0.01 parts of a cumene hydroperoxide and 0.01 parts of ferrous sulfate were added. An emulsion polymerization process was then initiated with the reactor kept at 10° C. After the initiation of the polymerization process, five parts of 1,3-butadiene was added at a time when the polymerization conversion rate became 66%. Thereafter, at a time when the polymerization conversion rate became 80%, 10% by weight of an aqueous solution of hydroquinone was added to the reactor to stop the polymerization reaction, followed by an addition of 0.5 parts of 2,6-di-tert-butyl-4-methylphenol and removal of the unreacted monomers from the polymerization reaction resultant solution to obtain latex of acrylonitrile-butadiene copolymers.

Next, 300 parts of coagulation water containing three parts of calcium chloride (coagulant) was added to a different reactor, and the latex obtained as mentioned above was added dropwise to the coagulation water while the coagulation water was being stirred at 50° C. Then, after polymer crumbs were precipitated while the pH was kept at 11.5 with an addition of an aqueous solution of potassium hydroxide, the polymer crumbs were separated from the coagulation water, washed with water, and dried under reduced pressure at 50° C. The resulting polymer crumbs were then dissolved in acetone to prepare an acetone solution with a polymer content of 15% by weight.

To the resulting acetone solution of acrylonitrile-butadiene copolymers, a silica-supported palladium (Pd) catalyst (1000 ppm by weight in the ratio of "Pd metal/acrylonitrile-butadiene copolymers") is added. The mixture was then brought into an autoclave equipped with a stirrer, and the dissolved oxygen was removed by causing nitrogen gas to flow for 10 minutes. Then, the system was purged with hydrogen gas twice and then pressurized with 5 MPa of hydrogen, and the contents were heated to 50° C. and stirred for 6 hours to cause a hydrogenation reaction to occur.

After the completion of the hydrogenation reaction, the reaction system was cooled to room temperature and hydrogen in the system was purged with nitrogen. Then, the silica-supported palladium catalyst was removed through filtration from the solution of the hydrogenated acrylonitrile-butadiene copolymers obtained from the hydrogenation reaction. From the resulting filtrate, a portion was sampled and brought into ten times the amount of water to precipitate polymers, which were then dried with a vacuum dryer for 24 hours to obtain a solid hydrogenated acrylonitrile-butadiene copolymer rubber (A1). The monomer composition of the resulting solid hydrogenated acrylonitrile-butadiene copolymer rubber (A1) was: acrylonitrile units: 40% by weight and 1,3-butadiene units (including the saturated units): 60% by weight. The resulting solid hydrogenated acrylonitrile-butadiene copolymer rubber (A1) has an iodine value: 6.0, a polymer Mooney value: 68, and $\Delta Tg$: 4.8° C.

Product Example (Production of Hydrogenated Acrylonitrile-Butadiene Copolymer Rubber (A2))

A reactor was charged with two parts of potassium oleate, 180 parts of ion-exchange water, 26 parts of acrylonitrile, and 0.5 parts of t-dodecylmercaptan in the stated order as an emulsifier. After purging of the reactor with nitrogen, 63 parts of 1,3-butadiene was added and the reactor was cooled to 10° C., then 0.01 parts of a cumene hydroperoxide and 0.01 parts of ferrous sulfate were added. An emulsion polymerization process was then initiated with the reactor kept at 10° C. After the initiation of the polymerization process, 6 parts of acrylonitrile was added when the polymerization conversion rate became 30%, and further 5 parts of acrylonitrile was additionally added when the polymerization conversion rate became 50%.

Thereafter, when the polymerization conversion rate became 80%, 10% by weight of an aqueous solution of hydroquinone was added to the reactor to stop the polymerization reaction process, followed by an addition of 0.5 parts of 2,6-di-tert-butyl-4-methylphenol and removal of the unreacted monomers from the polymerization reaction resultant solution to obtain latex of acrylonitrile-butadiene copolymers.

Hydrogenation reaction, coagulation, and drying were performed in the same manner as in the Product example 1 to obtain a solid hydrogenated acrylonitrile-butadiene copolymer rubber (A2). The monomer composition of the resulting solid hydrogenated acrylonitrile-butadiene copolymer rubber (A2) was: acrylonitrile units: 36% by weight and 1,3-butadiene units (including the saturated units) 64% by weight. The resulting solid hydrogenated acrylonitrile-butadiene copolymer rubber (A2) has an iodine value: 6.3, a polymer Mooney value: 70, and $\Delta Tg$: 6.6° C.

Product Example 3 (Production of Hydrogenated Acrylonitrile-Butadiene Copolymer Rubber (B1))

The reactor was charged with two parts of potassium oleate, 180 parts of ion-exchange water, 45 parts of acrylonitrile, and 0.5 parts of t-dodecylmercaptan in the stated order as an emulsifier. After purging of the reactor with nitrogen, 55 parts of 1,3-butadiene was added and the reactor was cooled to 10° C., then 0.01 parts of a cumene hydroperoxide and 0.01 parts of ferrous sulfate were added. An emulsion polymerization process was then initiated with the reactor kept at 10° C.

Thereafter, when the polymerization conversion rate became 90%, 10% by weight of an aqueous solution of hydroquinone was added to the reactor to stop the polymerization reaction, followed by an addition of 0.5 parts of 2,6-di-tert-butyl-4-methylphenol and removal of the unreacted monomers from the polymerization reaction resultant solution to obtain latex of acrylonitrile-butadiene copolymers.

Hydrogenation reaction, coagulation, and drying were carried out in the same manner as in the Product example 1 to obtain a solid hydrogenated acrylonitrile-butadiene copolymer rubber (B1). The monomer composition of the resulting solid hydrogenated acrylonitrile-butadiene copolymer rubber (B1) was: acrylonitrile units: 40% by weight and 1,3-butadiene units (including the saturated units): 60% by weight. The resulting solid hydrogenated acrylonitrile-butadiene copolymer rubber (B1) has an iodine value: 5.7, a polymer Mooney value: 71, and $\Delta Tg$: 11.0° C.

Embodiment 1 (E1)

100 parts of hydrogenated acrylonitrile-butadiene copolymer rubber (A1), 30 parts of N550 carbon black (product name "Seast G-SO" of Tokai Carbon Co., Ltd., "Seast" being the registered trademark), 10 parts of silica (product name "Aerosil R972V" of Aerosil Co., Ltd., "Aerosil" being the registered trademark), 5 parts of a zinc oxide, 10 parts of tri-2-ethylhexyl trimellitate (product name "Adekasizer C-8" of ADEKA, plasticizer, "Adekasizer" being the registered trademark), 1.5 parts of 4,4'-di-($\alpha$, $\alpha$-dimethylbenzyl) diphenylamine (product name "Nocrack CD" of Ouchi Shinko Chemical Industrial, antiaging agent, "Nocrack" being the registered trademark), 1.5 parts of a 2-mercaptobenzimidazole zinc salt (product name "Nocrack MBZ" of Ouchi Shinko Chemical Industrial, antiaging agent), 1 part of triphenylphosphine, and 10 parts of co-poly-(paraphenylene/3,4'-oxidiphenylene terephtaramide) short fibers (product name "Technora ZCF 1-12 T323SB 1 mm" of Teijin Technoproducts, para-type aramid short fibers, average fiber length: 1 mm, average fiber diameter: 12 µm, "Technora" being the registered trademark) were kneaded at chamber setting temperature: 50° C. for 5 minutes. The mixture was then transferred to open rolls, and 8 parts of 1,3-bis(t-butylperoxyisopropyl)benzene 40% product (product name "Vul Cup 40KE" of Arkema K. K., organic peroxide cross-linking agent, "VUK-CUP" being the registered trademark) was mixed, and the mixture was kneaded at 50° C. for 5 minutes to yield a cross-linkable nitrile rubber composition. Then, the cross-linkable rubber composition obtained above was used to evaluate normal physical properties and cold resistance. The results are illustrated in Table 1.

Embodiment 2 (E2)

Except for a change of one part of triphenylphosphine to one part of a triphenylphosphine oxide, the evaluation was performed in the same manner as Embodiment 1. The results are illustrated in Evaluation 1.

Embodiment 3 (E3)

Except that the hydrogenated acrylonitrile-butadiene copolymer rubber (A1) was changed to the hydrogenated acrylonitrile-butadiene copolymer rubber (A2), the evaluation was performed in the same manner as Embodiment 2. The results are illustrated in Table 1.

Comparative Example 1 (CE1)

Except that triphenylphosphine was not added, the evaluation was performed in the same manner as Embodiment 1. The results are illustrated in Table 1.

Comparative Example 2 (CE2)

Except that the hydrogenated acrylonitrile-butadiene copolymer rubber (A1) was changed to the hydrogenated acrylonitrile-butadiene copolymer rubber (B1), the evaluation was performed in the same manner as Embodiment 1. The results are illustrated in Table 1.

Comparative Example 3 (C3)

Except that 10 parts of co-poly-(paraphenylene/3,4'-oxydiphenylene terephthalamide) short fibers (product name "Technora ZCF 1-12 T323SB 1 mm" of Teijin Technoproducts, para-type aramid short fibers, average fiber length: 1 mm, average fiber diameter: 12 µm) was not added, the evaluation was performed in the same manner as Embodiment 1. The results are illustrated in Table 1.

TABLE 1

| | | | E1 | E2 | E3 | CE1 | CE2 | CE3 |
|---|---|---|---|---|---|---|---|---|
| formulation | hydrogenated acrylonitrile-butadiene copolymer rubber (A1) | (parts) | 100 | 100 | | 100 | | 100 |
| | hydrogenated acrylonitrile-butadiene copolymer rubber (A2) | (parts) | | | 100 | | | |
| | hydrogenated acrylonitrile-butadiene copolymer rubber (B1) | (parts) | | | | | 100 | |
| | N550 carbon black | (parts) | 30 | 30 | 30 | 30 | 30 | 30 |
| | silica | (parts) | 10 | 10 | 10 | 10 | 10 | 10 |
| | zinc oxide | (parts) | 5 | 5 | 5 | 5 | 5 | 5 |
| | tri-2-ethylhexyl trimellitate | (parts) | 10 | 10 | 10 | 10 | 10 | 10 |
| | 4,4'-di-($\alpha$,$\alpha$-dimethylbenzyl)diphenylamine | (parts) | 1.5 | 1.5 | 1.5 | 1.5 | 1.5 | 1.5 |
| | 2-mercaptobenzimidazole zinc salt | (parts) | 1.5 | 1.5 | 1.5 | 1.5 | 1.5 | 1.5 |
| | triphenylphosphine | (parts) | 1 | | | | 1 | 1 |
| | triphenylphosphine oxide | (parts) | | 1 | 1 | | | |
| | co-poly-(paraphenylene/3,4'-oxydiphenylene terephthalamide) short fibers | (parts) | 10 | 10 | 10 | 10 | 10 | |
| | 1,3-bis(t-butylperoxyisopropyl)benzene, 40% product | (parts) | 8 | 8 | 8 | 8 | 8 | 8 |
| normal physical properties | tensile strength | (MPa) | 24.8 | 24.6 | 23.7 | 23.5 | 22.6 | 26.7 |
| | elongation | (%) | 180 | 190 | 200 | 170 | 170 | 330 |
| | 10% tensile stress | (MPa) | 4.86 | 5.03 | 4.67 | 4.93 | 5.21 | 0.46 |
| cold resistance | 50% impact brittleness temperature | (° C.) | −28.3 | −27.9 | −29.5 | −23.7 | −21.8 | ≤−50 |

As shown in Table 1, the rubber cross-linked products obtained from the nitrile group-containing copolymer rubber compositions (Embodiments 1 to 3), in each of which the nitrile group-containing copolymer rubber having the iodine value smaller than or equal to 120 and the glass transition temperature difference ΔTg lower than or equal to 10° C. contained 1 to 30 parts of short fibers having the average fiber length smaller than or equal to 12 mm and 0.1 to 2 parts of the organophosphorus compound, had satisfactory 10% tensile stress values and 50% impact brittleness temperature values, in comparison to the nitrile group-containing copolymer rubber composition not containing an organophosphorus compound (Comparative Example 1), the nitrile group-containing copolymer rubber composition having the glass transition temperature difference ΔTg of the nitrile group-containing copolymer rubber exceeding 10° C. (Comparative Example 2), and the nitrile group-containing copolymer rubber composition not containing short fibers (Comparative Example 3).

From these results, it is found that it is possible to obtain a rubber cross-linked product having high tensile stress and excellent cold resistance from a nitrile group-containing copolymer rubber composition, where nitrile group-containing copolymer rubber with an iodine value smaller than or equal to 120 and a glass transition temperature difference ΔTg lower than or equal to 10° C. contains short fibers having an average fiber length smaller than or equal to 12 mm and an organophosphorus compound.

Although the mode for carrying out the present invention has been described with reference to the embodiments, the present invention is not limited to the specific carrying out mode or embodiments, and various modifications and changes can be made within the scope of the invention as claimed.

The present international application claims priority to Japanese Patent Application No. 2017-65322 filed Mar. 29, 2017, the entire contents of which are hereby incorporated herein by reference.

The invention claimed is:

1. A nitrile group-containing copolymer rubber composition, comprising:
    a nitrile group-containing copolymer rubber with an iodine value smaller than or equal to 120;
    short fibers with an average fiber length smaller than or equal to 12 mm;
    an organic peroxide; and
    an organophosphorus compound,
    wherein a glass transition temperature difference ΔTg of the nitrile group-containing copolymer rubber is lower than or equal to 10° C.

2. The nitrile group-containing copolymer rubber composition as claimed in claim 1, comprising 1 to 30 parts of the short fibers by weight relative to 100 parts by weight of the nitrile group-containing copolymer rubber.

3. The nitrile group-containing copolymer rubber composition as claimed in claim 1, comprising
    0.1 to 2.0 parts of the organophosphorus compound by weight relative to 100 parts by weight of the nitrile group-containing copolymer rubber.

4. The nitrile group-containing copolymer rubber composition as claimed in claim 1, wherein
    the organophosphorus compound is an organic phosphine compound.

5. A nitrile group-containing copolymer rubber cross-linked product obtained from cross-linking the rubber composition claimed in claim 1.

6. The nitrile group-containing copolymer rubber composition as claimed in claim 1, wherein
    the organophosphorus compound is selected from the group consisting of trimethylphosphine, triethylphosphine, tributylphosphine, triphenylphosphine, tris(paratril)phosphine, tris(parafluorophenyl)phosphine, tris(2,6-dimethylphenyl)phosphine, triphenylphosphine oxide, diphenylmethylphosphine oxide, triphenylphosphine sulfide, diphenylmethylphosphine sulfide and combinations thereof.

7. The nitrile group-containing copolymer rubber composition as claimed in claim 1, wherein
    the organophosphorus compound is selected from the group consisting of triphenylphosphine, triphenylphosphine oxide, triphenylphosphine sulfide and combinations thereof.

* * * * *